United States Patent
Thel

(10) Patent No.: US 8,168,931 B1
(45) Date of Patent: May 1, 2012

(54) SOLAR TRACKING DEVICE

(75) Inventor: Anton Bogdan Thel, Epson, NH (US)

(73) Assignee: Concrete Systems, Inc., Hudson, NH (US)

( * ) Notice: Subject to any disclaimer, the term of this patent is extended or adjusted under 35 U.S.C. 154(b) by 302 days.

(21) Appl. No.: 12/653,163

(22) Filed: Dec. 9, 2009

(51) Int. Cl.
*G01J 1/20* (2006.01)
*F24J 2/40* (2006.01)
*B66F 3/24* (2006.01)

(52) U.S. Cl. ............... 250/203.4; 126/601; 126/606; 136/246

(58) Field of Classification Search ............ 250/203.1, 250/203.3, 203.4; 136/243, 244, 246; 126/571, 126/600, 601, 605, 606, 607
See application file for complete search history.

(56) References Cited

U.S. PATENT DOCUMENTS

| | | | | |
|---|---|---|---|---|
| 4,332,239 | A * | 6/1982 | Hotine | 126/576 |
| 5,317,145 | A * | 5/1994 | Corio | 250/203.4 |
| 6,284,968 | B1 * | 9/2001 | Niesyn | 136/246 |
| 6,363,667 | B2 * | 4/2002 | O'Neill | 52/200 |
| 7,763,835 | B2 * | 7/2010 | Romeo | 250/203.4 |
| 7,793,654 | B1 * | 9/2010 | Thorne | 126/683 |
| 8,076,625 | B2 * | 12/2011 | McDonald | 250/203.4 |
| 2003/0045949 | A1 * | 3/2003 | Stone et al. | 700/61 |
| 2006/0054162 | A1 * | 3/2006 | Romeo | 126/600 |
| 2006/0096586 | A1 * | 5/2006 | Hayden | 126/600 |
| 2009/0014054 | A1 * | 1/2009 | Cano Messeguer et al. | 136/246 |
| 2009/0107485 | A1 * | 4/2009 | Reznik et al. | 126/600 |
| 2009/0188488 | A1 * | 7/2009 | Kraft et al. | 126/601 |
| 2009/0260619 | A1 * | 10/2009 | Bailey et al. | 126/578 |
| 2010/0024802 | A1 * | 2/2010 | Van Der Westhuyzen | 126/606 |
| 2010/0102202 | A1 * | 4/2010 | Sherman | 250/203.4 |
| 2010/0180886 | A1 * | 7/2010 | Chang | 126/601 |
| 2010/0236600 | A1 * | 9/2010 | Kimura et al. | 136/246 |
| 2011/0041834 | A1 * | 2/2011 | Liao | 126/605 |
| 2011/0056484 | A1 * | 3/2011 | Rogers | 126/600 |
| 2011/0067324 | A1 * | 3/2011 | French et al. | 52/167.1 |
| 2011/0079214 | A1 * | 4/2011 | Hon | 126/573 |
| 2011/0108019 | A1 * | 5/2011 | Minick et al. | 126/600 |
| 2011/0114080 | A1 * | 5/2011 | Childers et al. | 126/601 |

* cited by examiner

*Primary Examiner* — John Lee
(74) *Attorney, Agent, or Firm* — Stephen W. White

(57) ABSTRACT

A dual axis tracker is a solar collecting device with fully mobile panel arrays that can be fully rotated 360° and tilted from a 90° position to a 10° position relative to the earth and is easy to maintain and operate. This device has a base support followed by a stable lower column attached thereto and a movable or rotatable upper column that permits full rotation located thereon. This permits the full rotation. A motorized jack is employed to tilt the panel array from the 90° position to a 10°. Since the array is held higher off the ground by a longer lower column, such vertical positioning is achieved in a better manner than prior art devices. Because of these movements more power can be produced in a given amount of time than prior art devices. In addition, during periods of snowfall, this device can collect more radiation off the accumulated snow cover that will surround the device thus taking advantage of said radiation to produce even greater power than previously possible.

3 Claims, 5 Drawing Sheets

SOLAR TRACKING DEVICE

CROSS REFERENCES TO RELATED APPLICATIONS

This application is related to my previously filed patent application AT-100-A, Ser. No. 12/590,749, filed Nov. 16, 2009

BACKGROUND OF THE INVENTION

1. Field of the Invention

This application relates to the field of solar tracking devices and more specifically to dual axis solar tracking devices that are employed in the generation of electrical energy. Even more specifically, this invention is related to dual axis solar tracking devices that can be easily deployed and have an excellent ability to track the sun in order to produce green energy therefrom.

2. Description of the Prior Art

Since there has been available technology, there has been an effort to harness the energy that is produced on a daily basis by the sun. Well known among these efforts is a means of producing electrical energy using solar devices that employ solar collection devices of well-known materials that collect the sun's energy. These collection elements (also known as photovoltaic P.V. cells) are usually mounted on a flat panel (now known as a P.V. module) with a protective skin or other layer laid over the top. These modules are then grouped as P.V. arrays. As the sun hits the collection elements, heat and energy is produced. Some of these devices are manufactured so as to move as the sun moves across the sky during the day and to present the flat array perpendicular to the sun's rays. This power as produced is then fed into the electrical grid and transmitted to sites where it is useful. These devices have come into high use recently as there is a continuing effort to produce renewable energy that does not require the use of fossil fuels, for example. Renewable energy is considered to be clean and green with little or no production of pollution. Farms of these arrays are now becoming common around the world.

As I mentioned, some of these devices are set to track the path of the sun during the day and thus to be more energy efficient and are placed throughout the world. Arrays of these panels mounted on suitable base supports and then linked together in a collection and transmission make more efficient use of such elements, compared to immovable (fixed) arrays. Most of these prior art devices are also situated in areas of high sunlight and long, sunny days. In my previously filed invention (AT-100-A, U.S. Ser. No. 12/590,749, filed Nov. 16, 2009), I describe segmented base supports for these trackers that permit their installation in areas where the grounds might be unsteady or suitable for such heavy elements. In that invention, the base supports will hold the heavy devices even on landfill areas, Brownfields and superfund sites that may now be closed to use. Such areas are usually free of high vegetation, are flat in nature and open to the sky so as to be eminently suitable for solar collectors.

There has, however, been a long standing need to have such solar collecting devices that can be rotated 360° while in a flat or horizontal mode and at least from 90° to 10° when in a vertical mode relative to the earth. Both of these states are requisite to the proper operation of solar collection devices in a variety of climates. Both modes are necessary so as to present the array in a perpendicular position to the sun during the day from early morning to the evening all year long. Both of these modes are also requisite to position the array in a vertical position so that the flat surfaces are safely positioned during storms or high winds in order to preclude damage to the sensitive surfaces of such devices. Most prior art devices cannot fully achieve these limits and are thus defective in getting the best out of the device itself. There is a pressing need to offer a solar collection device that can fully achieve a panel rotation of 360° whilst in the full, flat and horizontal position and from a 90° position in the horizontal position to a 10° position relative to the earth. No prior art solar collection devices can attain these positions and most can rotate only 270° in the horizontal or azmuthal position and can lower only to around 20°.

SUMMARY OF THE INVENTION

It thus is the object of this invention to make a solar collection device that can fully achieve a panel rotation of 360° whilst in the full, flat and horizontal position and from a 90° position in the horizontal position to a 10° position relative to the earth. These and yet other objections are achieved in a solar collection device comprising;

1. a base support system;
2. an immovable lower column having an exterior surface, a hollow interior and a top and a bottom, wherein said bottom is firmly attached to said support system, a rotating slewing bearing system having a top side and a bottom side, a large sprocket attached to said bottom side of said slewing bearing system and further attached to said top of said lower column, and wherein said lower column contains a rotating power collector located within the hollow interior thereof;
3. a rotatable upper column having an exterior surface, a hollow interior, a top and a bottom wherein said bottom is rotatably attached to said slewing bearing interior top from said lower column and having a geared motor attached to the exterior of said upper column wherein geared motor is rotatably connected to said large sprocket by a chain;
4. an adjustable solar array located on the top of said upper column and supported by a series of beams;
5. energy transmission lines emanating from said solar array down to collection devices located on the exterior of said columns and then passing through said rotating power collector and then exiting therefrom;
6. a solar array tilting device comprising a motor driven screw jack attached to a transfer beam of said array and bracketedly supported on said upper column; and,
7. a computer system electrically and integrally connected to said motors of said rotating and tilting devices, so that when required, said computer can actuate said rotating and tilting devices so that said solar array can be rotated in the horizontal position 360° and can be tilted in the vertical position from a 90° to a 10° position.

DETAILS OF THE INVENTION

Figure 1:
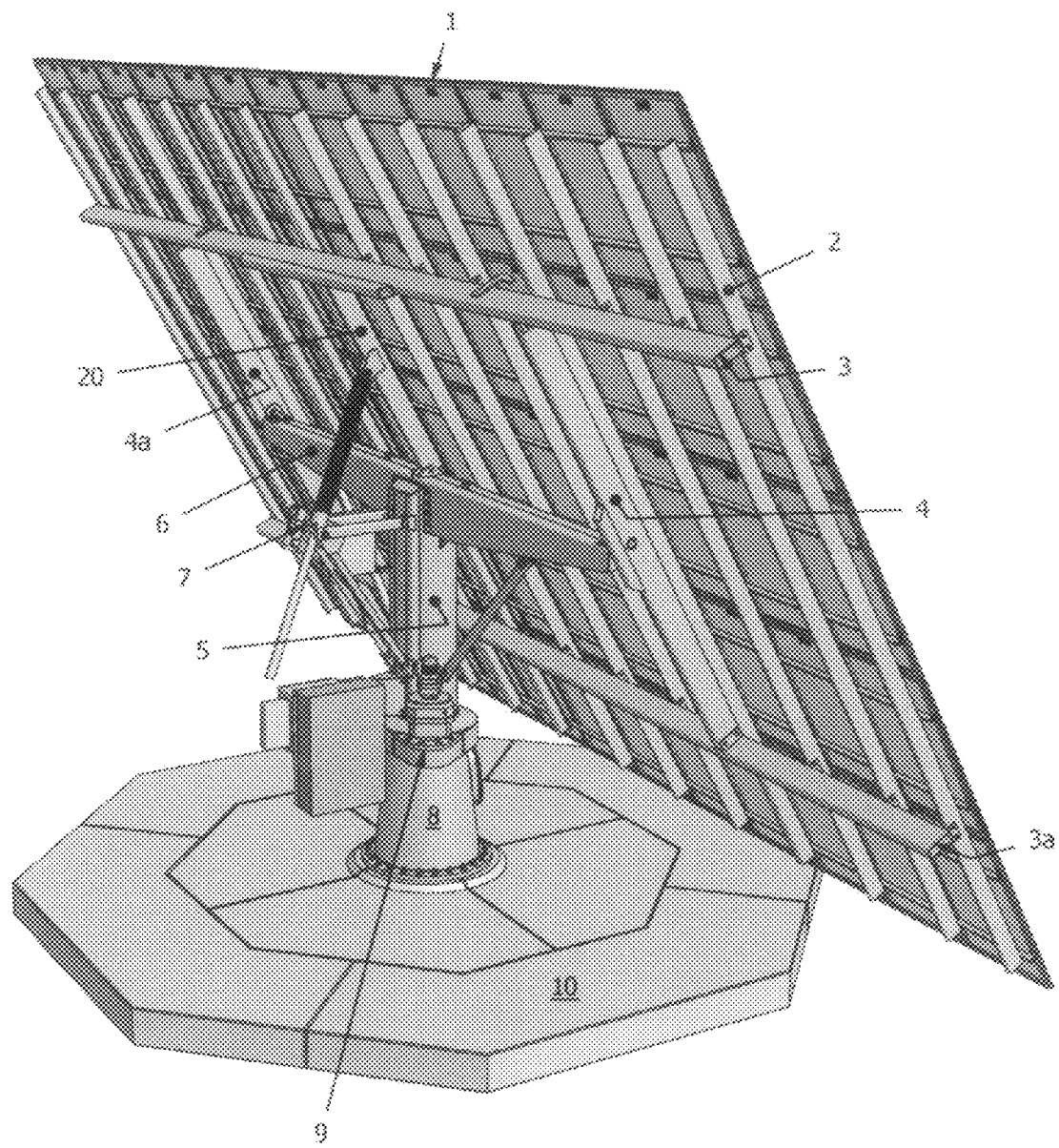
FIG. 1 is a drawing of the solar dual axis tracker device of this invention in perspective view from the rear thereof.

Looking now specifically at the drawings, which are a purported best mode of this invention at the time of filing, but to which the inventor does not feel limited by, FIG. 1 is a perspective view of a typical solar panel device of this invention from the back side thereof. In this FIG. 1 is the solar array made up of a number of solar panels joined together. Electrical elements will adjoin all of these panels and will flow downwardly (not shown in the figure). The array is supported by a number of transversal beams, one of which is shown as 2. Two larger longitudinal beams are shown as 3 and 3a and another pair of cross beams as 4 and 4a. An upper rotatable column is shown as 5 and this is movably connected to cross supports 4 and 4a via main beam 6. The panel tilting device is shown as 7. Upper rotatable column 5 is connected to the lower column 8 at movable joint 9 and is further firmly attached to the base support 10.

Figure 2:
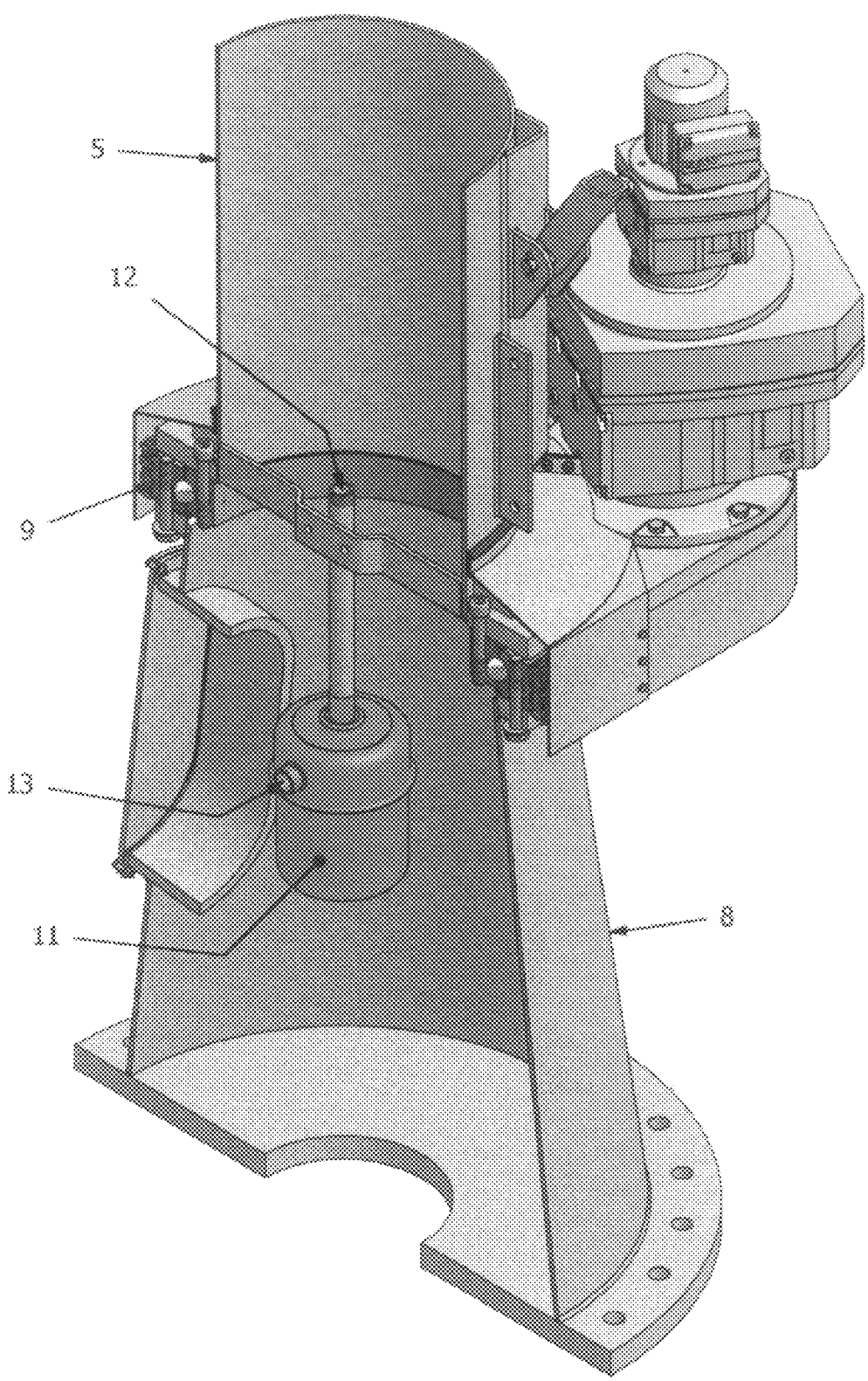
FIG. 2 is a detailed and cut-away showing of the lower column on the base plate with some of the mechanical elements therein and thereon.
Figure 6:
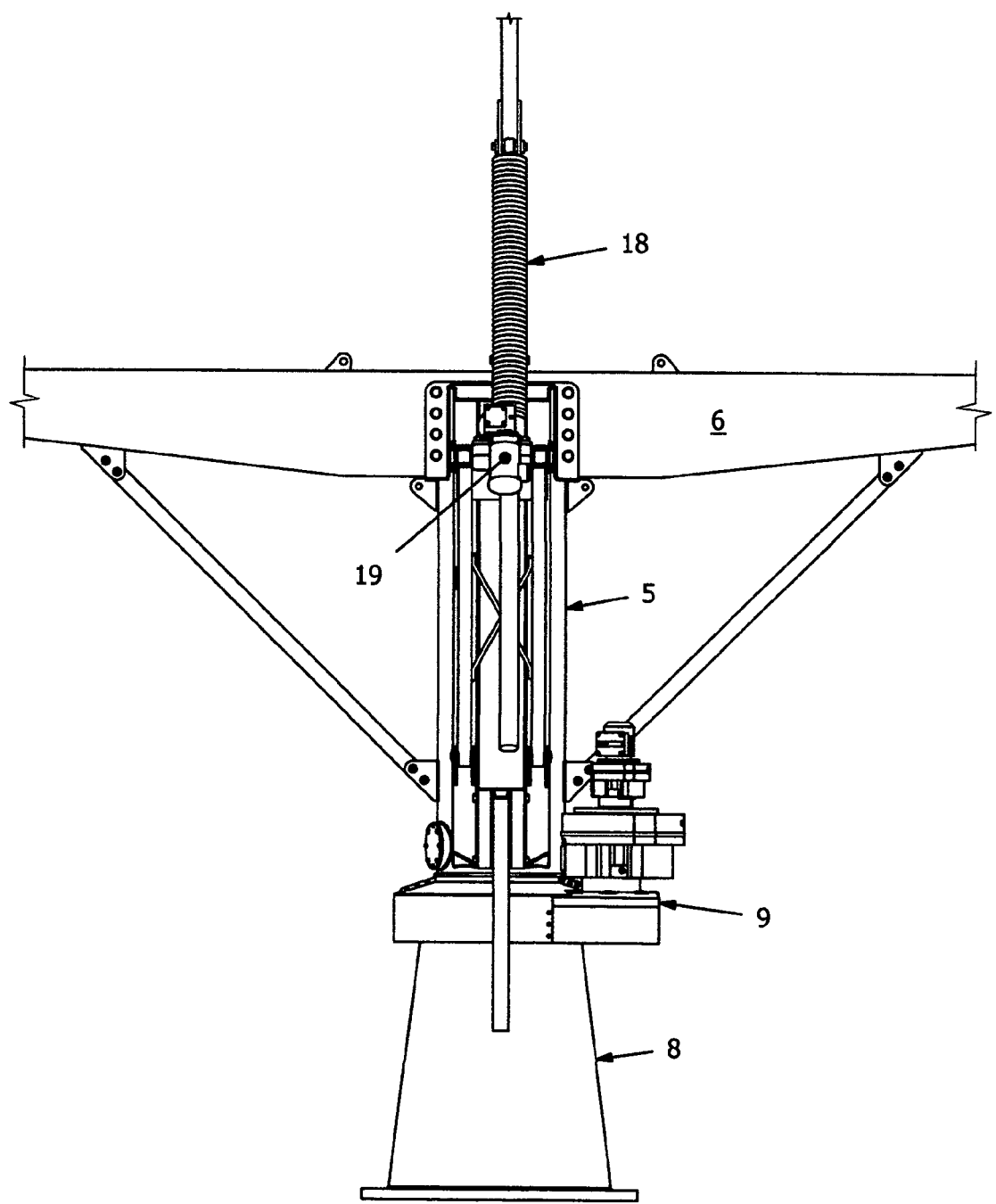
FIG. 6 is another showing of the back view of the upper column and the tilting device for the solar array.

FIG. 2 is a cut-away view of the lower column as it is attached to the rotatable upper column. In this FIG. 6 is the upper column and 8 is the lower column and 9 the slewing bearing that serves to rotate the upper column. Also shown in the interior of the lower column is an electrical rotating power collector 11. This device has an entry point for electrical transmission wires emanating from the solar array at 12 and an exit point therefore at 13. The wires themselves are not shown herein. This device has a series of rings and contact points therein so that electrical energy flows down to the rings and out through the contact points and the wires themselves are not tangled as the device rotates. This device can be obtained from and is similar to that sold as Gleason Reel Slip Rings by Hubbel Co. of Mayville, Wis.

Figure 3:
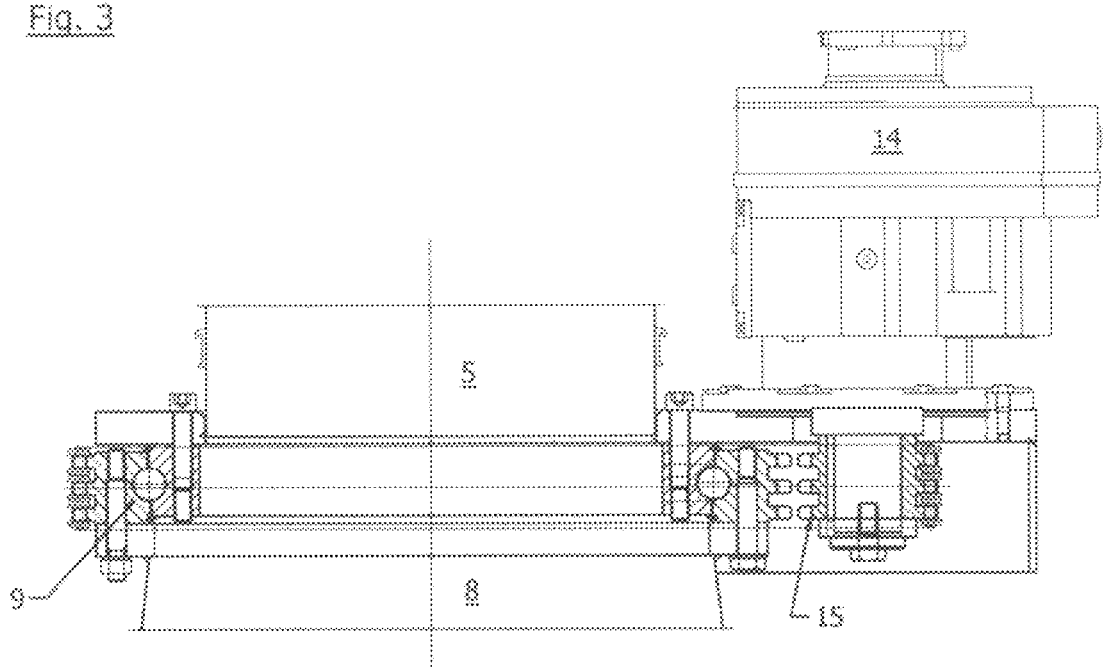
FIG. 3 is a showing of the movable portion of the upper column and the driving mechanism therefore.
Figure 4:
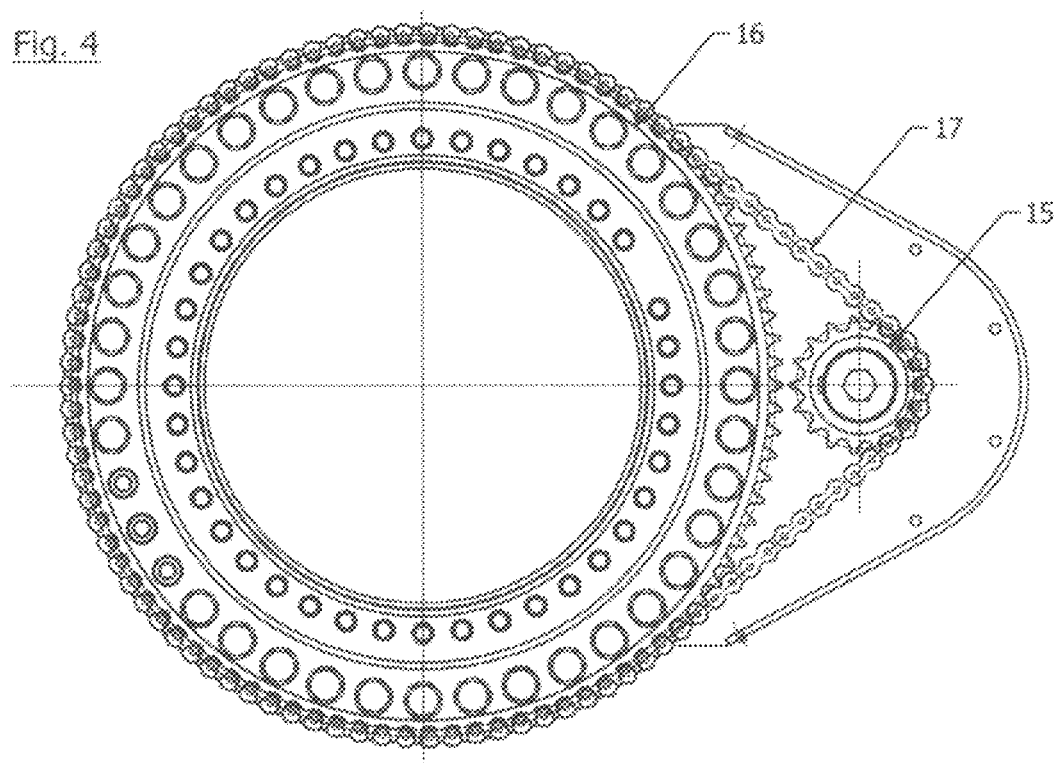
FIG. 4 is a detail of the chain, sprocket and gear for rotating the upper column as seen from the bottom of FIG. 3 . . . .

FIG. 3 is a side view showing of the slewing bearing mechanism that joins at 9 the upper column 5 to the lower column 8 and functions to rotate the upper column in relationship to the lower. The gear box with an electric motor on top (not shown herein) which will drive this function is shown as 14 and a small sprocket as 15. In FIG. 4 (bottom view of FIG. 3), we see small sprocket 15 (which in FIG. 3 is attached to shaft of gear box 14) connected with large sprocket 16 (outer part of slewing bearing) via roller chain 17. The part 16 is suitably mounted to the top of the lower column while the upper column 5 is mounted to the top of the inner part of the slewing bearing. In the operating mode, the small sprocket rotates circumferentially around the lower column 8 by the chain 17 attached to large sprocket 16. Since the gear box 14 and the small sprocket 15 are mounted on the side of the upper column, they will carry the upper column 5 in a rotating manner around the lower column 8. A full, 360° of rotation is thus achieved. Since the wires internal to this device are passed through an electrical rotating power connector shown as 11 there is no chance of severing or twisting these wires.

Figure 5:
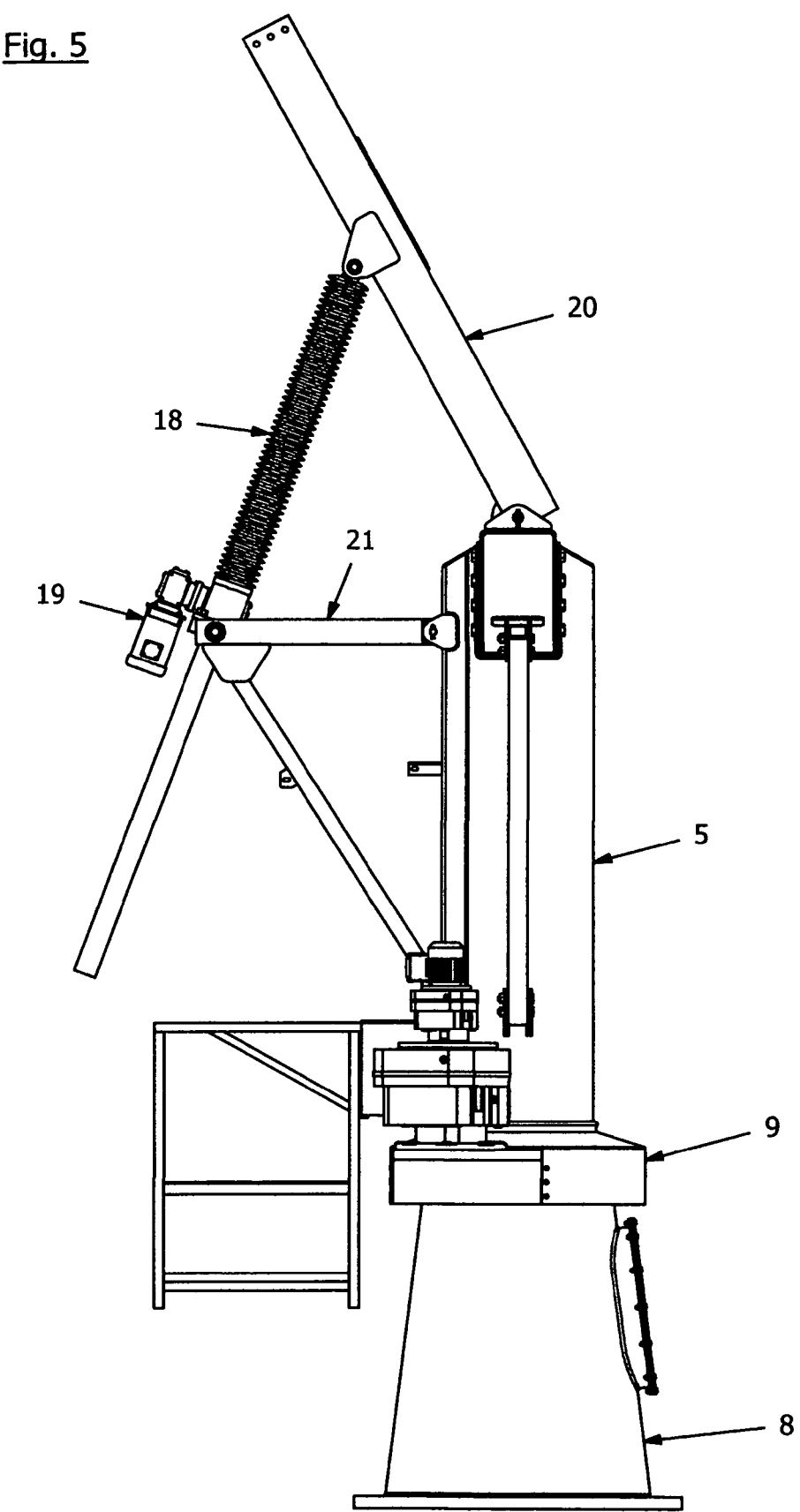
FIG. 5 is a detail showing of the side view of the upper column and the tilting device for the solar array.

In FIG. 5 there is a side view of the device that serves to tilt the solar array. In this figure once again 5 is the rotatable upper column and 8 the lower and main support column. The rotating device which will rotate the upper column in relationship to the lower column is shown as 9. The screw jack which can fully tilt the solar panel array is seen as 18 and will be driven by motor 19. It is attached to the transfer beam at 20 and itself is supported by a bracket system 21 to upper column 6.

FIG. 6 is a side view of FIG. 5 wherein the solar panel array (not specifically shown herein) is in a semi-vertical position, being held by main beam 6.

What makes this all unique is the combination of elements all of which serve to mobilize the array in such a manner as to enable the system to constantly track the sun and the sun movement and at the same time be able to move to safe positions in case of storms or other events that might harm the delicate elements contained therein. Most prior art devices cannot fully rotate because of their inability to continue to make electrical connection without damaging the electrical lines contained therein. Additionally, by employing a bottom or lower section, we are able to lift the solar array higher off the ground thus permitting the tilting to occur more readily and at a further distance stretching from the fully horizontal to the almost fully vertical position. This base also permits a higher depth of snowfall without harming the operations of the solar collection devices. For example, the solar array described herein is about 52 to 27 feet in size. To support such a solar array and to permit the desired rotation and tilt I prefer to have a lower column of between about to 12 to 100 inches. This will permit my device to tilt even when there is considerable snow pack around the base thereof. The elements I describe herein have never before been used in this manner even though many of the bits and pieces of this construction are known. The ability to put all of these elements together in this manner is critical to the full operation of my novel solar tracking device and has never been done before.

The construction of a suitable base for the dual axis tracker utile within my invention has been fully described in my previously filed application, AT-100-A, Ser. No. 12/590,749, filed Nov. 16, 2009. The base support thereof may be round, oval or octagonal in shape and may be made in a single pour of cementitious material on site or be made in segmented portions as described in that application. All of the other materials of construction and the solar panels and arrays themselves are also well-known in the prior art. The computerization of such solar arrays so that motion can be achieved and directions pointed, is also well-known. Most of these prior art systems are designed to be self-operating and when atmospheric conditions arise to pose any is problem, the devices will actuate and reduce that showing towards the storm or other event so as to minimize any problems. However, my device is much better at performing this function since it is able to rotate and tilt better than any prior art element. Another advantage of my device is that it is simple to operate and maintain. By employing materials of construction that are fully galvanized or made from stainless steel, and by protecting the movement of the rotating device interiorly kept in the upper column, low maintenance is achieved. A simple yearly inspection and greasing is all that is requisite to operating this device.

A plurality of dual axis trackers is normally placed within a site that has been chosen to support these panels and is open to sunlight. The arrays are then linked together to produce more electricity. Having these banks controlled by the system that I have described means that the entire site will produce more electricity and be easier to operate than a site with conventional, prior art elements therein.

What I am claiming is:
1. A solar collection device comprising in order;
   a. a base support system having a central connection point;
   b. an immovable lower column having an exterior surface, a hollow interior and a top and a bottom, wherein said bottom is firmly attached to said base support system at said central connection point;
   c. on top of said lower column a rotating slewing bearing system, said slewing bearing system having a top upper ring, said upper ring having a top and a bottom, and a lower outer ring, said outer ring having a top and a bottom, wherein said bottom of said lower outer ring is firmly connected to said top of said lower column;

d. contained within said slewing bearing system a large sprocket rotatably attached by a chain to a geared motor adjacent thereto and said sprocket is also attached to said bottom of said upper ring of said slewing bearing system;

e. on top of said rotating slewing bearing system a rotatable hollow upper column having a top, a bottom, an exterior and an interior wherein said bottom is firmly connected to said top side of said upper ring of said slewing bearing;

f. a bracket system having first connection points attached to the exterior of said rotatable upper column and a second connection point opposite to said exterior of said rotatable upper column;

g. a motorized solar tilting device comprising a motor driven screw jack connected to said second connection point of said bracket system;

h. an adjustable solar array having a top surface comprising a series of solar panels and a bottom surface attached to a series of beams disposed thereon, wherein said solar array is bracketedly supported by a transfer beam firmly attached to said bottom surface of said solar array and to the top of said rotating upper column and wherein said motorized solar tilting device is attached one of said beams;

i. energy transmission lines emanating from said solar array down to a collection device located on the exterior of said upper column and then exiting therefrom; and, j. a computer system electrically and integrally connected to said slewing bearing geared motor and said motorized tilting motor;

so that when required, said computer system can actuate said geared motor and said motorized tilting device so that said solar array can be rotated 360° in the horizontal position relative to said base support and said solar array can be tilted 10° to 90° in the vertical position relative to a vertical line drawn down from the top of said rotating column to said base support.

2. The solar collection device of claim 1 wherein said array has a dimension of about 42 feet by 27 feet and wherein the length of said immovable lower column is between 12 to 100 inches.

3. The solar collection device of claim 1 wherein said device is located in a field containing a plurality of solar collection devices and electricity is provided from the collection of energy from the sun and is fed into a grid.

* * * * *